United States Patent [19]

Jansen, Jr.

[11] 4,039,176
[45] Aug. 2, 1977

[54] MARINE RISER SPIDER SHOCK ABSORBER APPARATUS

[75] Inventor: Martin B. Jansen, Jr., Houston, Tex.

[73] Assignee: Vetco Offshore Industries, Inc., Ventura, Calif.

[21] Appl. No.: 601,306

[22] Filed: Aug. 4, 1975

[51] Int. Cl.$^2$ .............................................. F16F 9/18
[52] U.S. Cl. ..................................... 267/125; 166/85
[58] Field of Search ............. 267/125, 65 R; 175/195; 166/85; 173/165, 166, 167, 162; 64/23.5, 23.6, 23.7

[56] References Cited

U.S. PATENT DOCUMENTS

| | | | |
|---|---|---|---|
| 2,170,057 | 8/1939 | Kerr | 166/85 |
| 2,976,930 | 3/1961 | Marquis et al. | 166/85 |
| 3,059,917 | 10/1962 | Allinquant | 267/65 R |
| 3,864,922 | 2/1975 | Dial et al. | 267/65 R |

*Primary Examiner*—James B. Marbert

[57] ABSTRACT

An apparatus is provided capable of absorbing shocks due to decelerating forces caused by landing of a marine riser on a spider resting on a rotary table. The apparatus includes a hydraulic shock absorber mounted on the rotary table which supports the spider on which the riser lands, the load and shock of the riser moving pistons in cylinders to force hydraulic oil in the cylinders through an orifice into an accumulator, effecting shifting of an accumulator piston against compressed air in the accumulator, which can exhaust through a pressure relief valve. The above action decelerates the riser and spider. Upon removing the weight of the riser from the spider, the compressed air in the accumulator, supplied from the suitable source, moves the accumulator piston back to its initial position, which acts through the hydraulic oil to effect upward return of the pistons to their initial positions. The apparatus permits lateral translation of the spider and also its tilting in all directions to limited degrees.

17 Claims, 4 Drawing Figures

MARINE RISER SPIDER SHOCK ABSORBER APPARATUS

The present invention relates to shock absorber apparatus, and more particularly to shock absorber apparatus capable of reducing the shock load of an oil and gas well marine riser in the event of its impacting with a high load on a spider supported on a rotary table, or the like, of a rig apparatus.

In the drilling of oil and gas wells in deep water, the total weight of the blowout preventer stack and the marine riser secured thereto, and extending to a stationary platform or floating vessel platform, could approximate 400,000 pounds. During the lowering of the stack and riser from the platform, riser sections are coupled to one another. The upper portion of each section has a support plate which lands on the dogs of a spider resting on the rotary table, for the purpose of supporting the marine riser string and blowout preventer stack, until the next riser section is connected to the one resting on the dogs. The marine riser string is then elevated a short distance to enable the dogs to be shifted from the path of the support plate, allowing further lowering of the marine riser string to occur, the dogs again being placed in the path of the next support plate so as to be capable of supporting the marine riser and stack.

Usually, each riser support ring is landed on the spider dogs with a relatively small impact load. Occasionally, however, the lowering speed of the riser is relatively great, causing the support plate to land on the spider dogs with a high impact load, which could damage the apparatus. The high impact load could be extremely high when one considers the total weight of the blowout preventer stack and the riser string as its length increases to a high value, which, for example, could be from 3,000 to 6,000 feet in the event of operations in relatively deep water.

By virtue of the present invention, an apparatus is provided capable of absorbing the kinetic energy associated with the weight of the riser string and blowout preventer stack and landing of the support plate on the spider dogs, by gradually bringing the riser and stack to a halt, particularly when the riser string support plate lands very hard on the spider dogs. In this manner, the energy is absorbed relatively gradually, and not suddenly, rather than having the energy incident to high shock loads absorbed in the riser connectors.

Accordingly, it is an object of the present invention to provide a shock absorber on which the spider is mounted, and which is capable of yieldably absorbing the shock of the load applied to the spider by the marine riser and apparatus connected thereto, such as a blowout preventer stack.

A further object of the invention is to provide a shock absorber apparatus that maintains a minimal distance between the spider and the main portion of the shock absorber, which is adapted to rest upon the rotary table, or the like, at the rig floor.

Still a further object of the invention is to provide a shock absorber which permits lateral translation of the spider with respect to the shock absorber apparatus, and also tilting of the spider in all directions to a limited degree.

In a more limited sense, the shock absorber system embodying the invention includes a cylinder and piston mechanism, in which the load imposed on the spider by the marine riser string imposes pressure on hydraulic oil in the cylinder mechanism to develop a pressure therein which is reduced by being forced through an orifice to decelerate the motion of the spider due to the riser impact velocity, the throttled oil passing into an accumulator and moving an accumulator piston against the pressure of air to bring the spider and riser string to a full stop, the complete arresting of the spider and riser string occurring as a result of bottoming of the accumulator piston in the accumulator cylinder. Upon elevating the riser string, the load on the spider is relieved and compressed air in the accumulator will act upon its piston and force the hydraulic oil in the system back to its upper position, which elevates the spider to its initial position, which, by way of example, can be an elevation of about three inches of the spider.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings.

Figure 1:
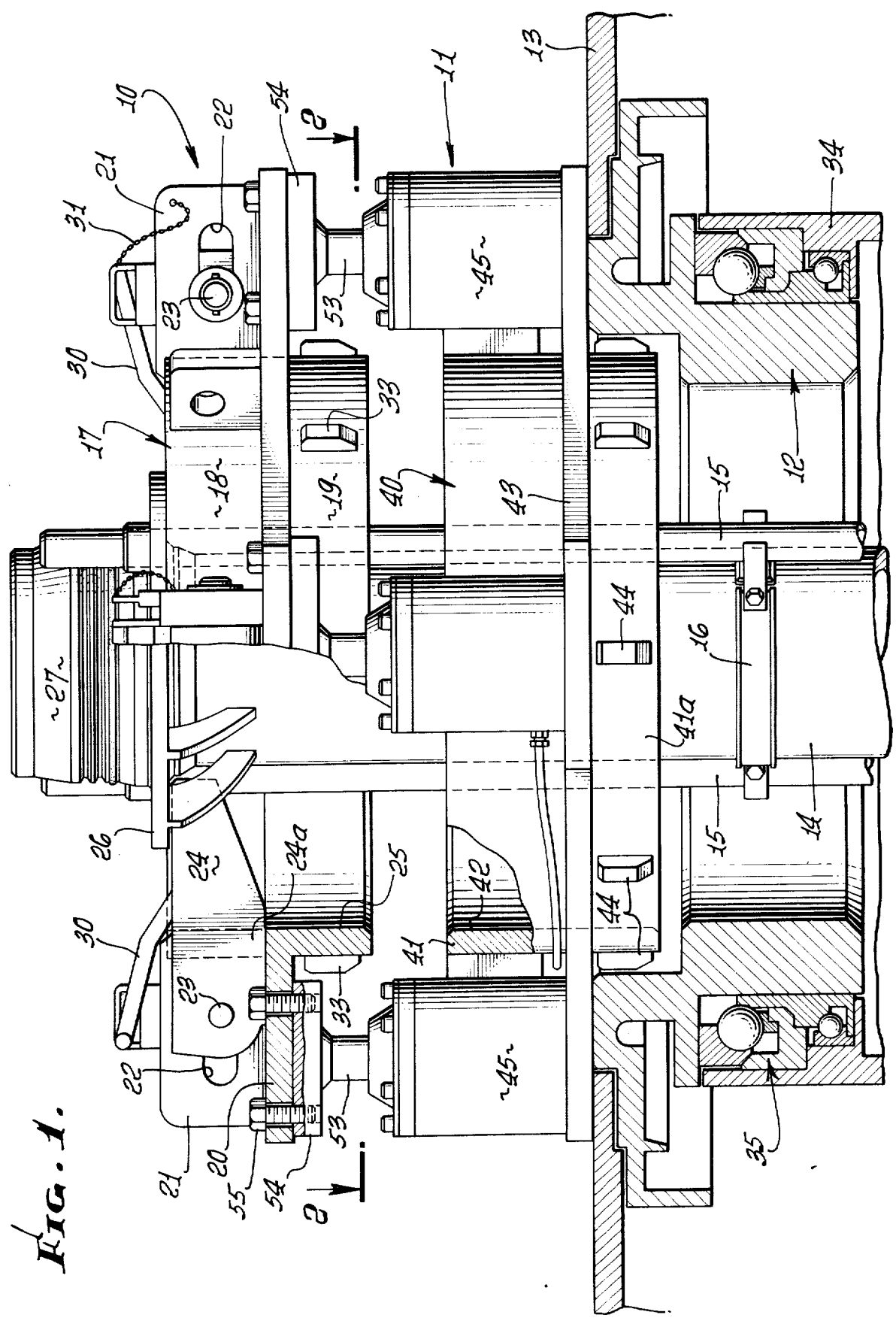
FIG. 1 is a longitudinal view, partly in section and partly in side elevation, illustrating a spider and shock absorber combination, with the shock absorber resting upon a rotary table, the shock absorber being disclosed as supporting a section of a marine riser string which may extend into the water at an offshore well location.

The system illustrated in the drawings includes a marine riser spider 10 supported by a shock absorber apparatus 11 resting upon the rotary table 12 at the rig floor 13. A section 14 of a marine riser is disclosed as resting upon the spider. This section may have choke and kill lines 15 suitably secured thereto, as through use of straps 16, which have a known purpose during the operation of drilling and completing an oil or gas well.

Essentially, the spider 10 is of a known type, including a main spider body 17 having central upper and lower cylindrical portions 18, 19 from which a central flange portion 20 extends radially. Circumferentially spaced sets of spaced apart vertical supports 21 are suitably secured to the flange and upper portion 18, each set having horizontal slots 22 therein in which pivot pins 23 are shiftably and rotatably mounted, each pin supporting a spider dog or arm 24. Each dog can occupy a horizontal position, as disclosed in FIG. 1, extending partially and inwardly across the central vertical opening 25 through the main spider body through which the riser 14 and its choke and kill lines 15 can move freely. Each dog has its rear portion 24a bearing against the flange portion 20 of the main spider body when in a horizontal position. When disposed in the horizontal position, the dogs are engageable by a riser support plate 26 suitably secured to the riser immediately below its upper pin end portion 27, which will constitute the inner portion of a connection made with the lower box end (not shown) of another riser section to be coupled to the riser section disclosed.

When the riser section 14 is elevated sufficiently to remove its support plate 26 from interference with the movement of the spider dogs or arms 24, the latter can be swung upwardly to a generally vertical position clear of the body opening 25, such action occurring upon grasping of a handle 30 suitably secured to each spider dog. A safety chain 31 interconnects the handle with the spider dog to prevent inadvertent loss of the dog.

The dogs or arms 24 are pivoted about the axes of their pivot pins 23, and such pins can be shifted horizontally in the slots 22, to permit the dogs to be appropriately associated with different diameters of riser sections and their support plates, the dogs occupying positions under the riser support plate 26, as illustrated in FIG. 1.

Heretofore, the spider 10 rested upon the rotary table 12, the lower portion or skirt 19 having circumferentially spaced radial centering lugs 33 thereon to appropriately center the spider with respect to the rotary table. In the present case, the spider does not rest upon the rotary table 12, which is suitably rotatably mounted on a supporting portion 34 of the rig through the agency of an appropriate bearing assembly 35. Instead, it is associated with the shock absorbing or decelerating apparatus 11. The apparatus includes a main shock absorber body 40, including an inner cylindrical portion 41 having an opening 42 generally conforming to the central opening 25 through the spider body. A base 43 extends outwardly from the cylindrical portion, which is adapted to rest upon the rotary table 12. Circumferentially spaced centering lugs 44 are mounted on the lower portion 41a of the cylindrical member which extend into the rotary table 12, for the purpose of centering the shock absorber body therein.

Figure 3:
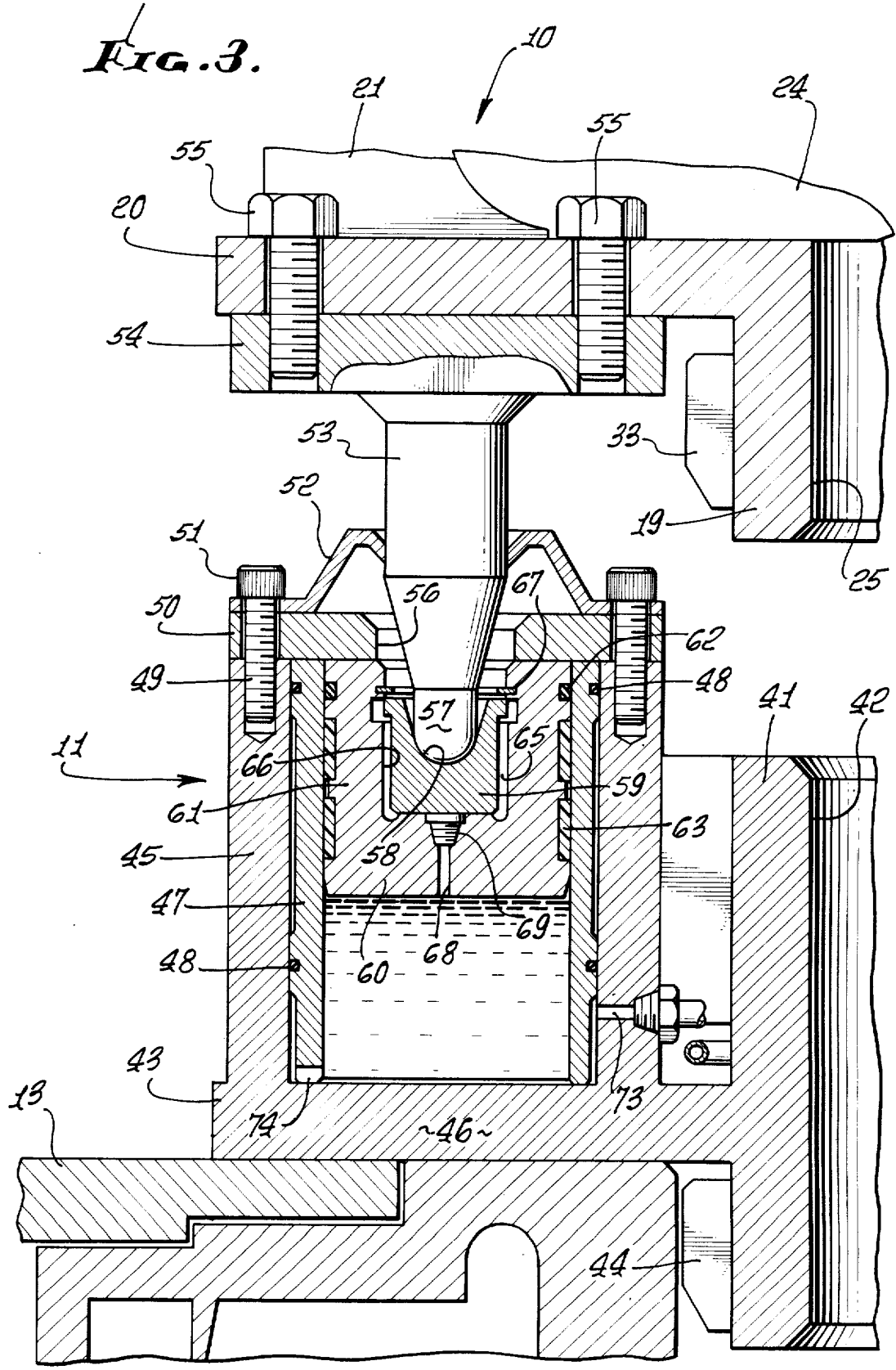
FIG. 3 is an enlarged vertical section through a portion of the spider and shock absorber apparatus illustrated in FIGS. 1 and 2.

Integral with the base 43 are a plurality of circumferentially spaced cylinders 45 extending upwardly from the base, the base constituting a cylinder head 46. Disposed within each cylinder is a cylinder sleeve 47 (FIG. 3) having vertically spaced seal rings 48 thereon to prevent leakage between the cylinder and sleeve, the cylinder sleeve being held downwardly in the cylinder by a plurality of screws 49 extending through an upper head 50 and threaded into the cylinder 45. The heads 51 of the screws bear against the outer portion of a protective cover 52 that extends inwardly and engages an extension rod 53 depending from the spider 10. The upper portion of the extension rod is integral with a base 54 bearing against the underside of the spider flange 20 and suitably secured thereto by a plurality of screws 55, the extension rod itself extending through a central opening 56 in the upper head and having a lower spherical or ball terminal 57 seated within a ball socket 58 of a slidable seat 59 bearing against the lower head 60 of a piston 61 slidable vertically within the cylinder 45 and its cylinder sleeve 47. Each piston has a plurality of seals 62, 63 thereon sealingly engageable with a wall of the sleeve, the lower seals 63 also being capable of functioning as bearings to insure the appropriate vertical shifting of the piston 61 in the sleeve 47.

It is to be noted that there is an annular clearance space 65 between the periphery of the seat 59 and the wall of the cavity 66 in which the seat is disposed, to permit bodily lateral translation of the seat within and relative to the piston. Upward movement of the slidable seat 59 within the piston 61 is limited by engagement of the upper end of the seat with a suitable split snap retainer ring 67 mounted within the inner portion of the piston and extending partially across the seat. For the purpose of bleeding air, or the like, from the cylinder below the piston, when the system is filled with hydraulic oil, a bleeder hole 68 is provided through the piston head 60, the upper end of which can be closed by a suitable plug 69.

Sets of cylinders, pistons and associated extension rods are provided around the main shock absorber body 40 and the spider body 17. As disclosed, four sets of cylinders 45, 47, pistons 61 and extension rods 53 are equiangularly displaced from one another, which, as described hereinbelow, will permit relative bodily lateral translation of the spider with respect to the shock absorber, as well as limiting tilting of the spider with respect to the shock absorber, because of the universal joint 57, 58 provided between the lower end of each extension rod 53 and the slidable seat 59.

Figure 2:
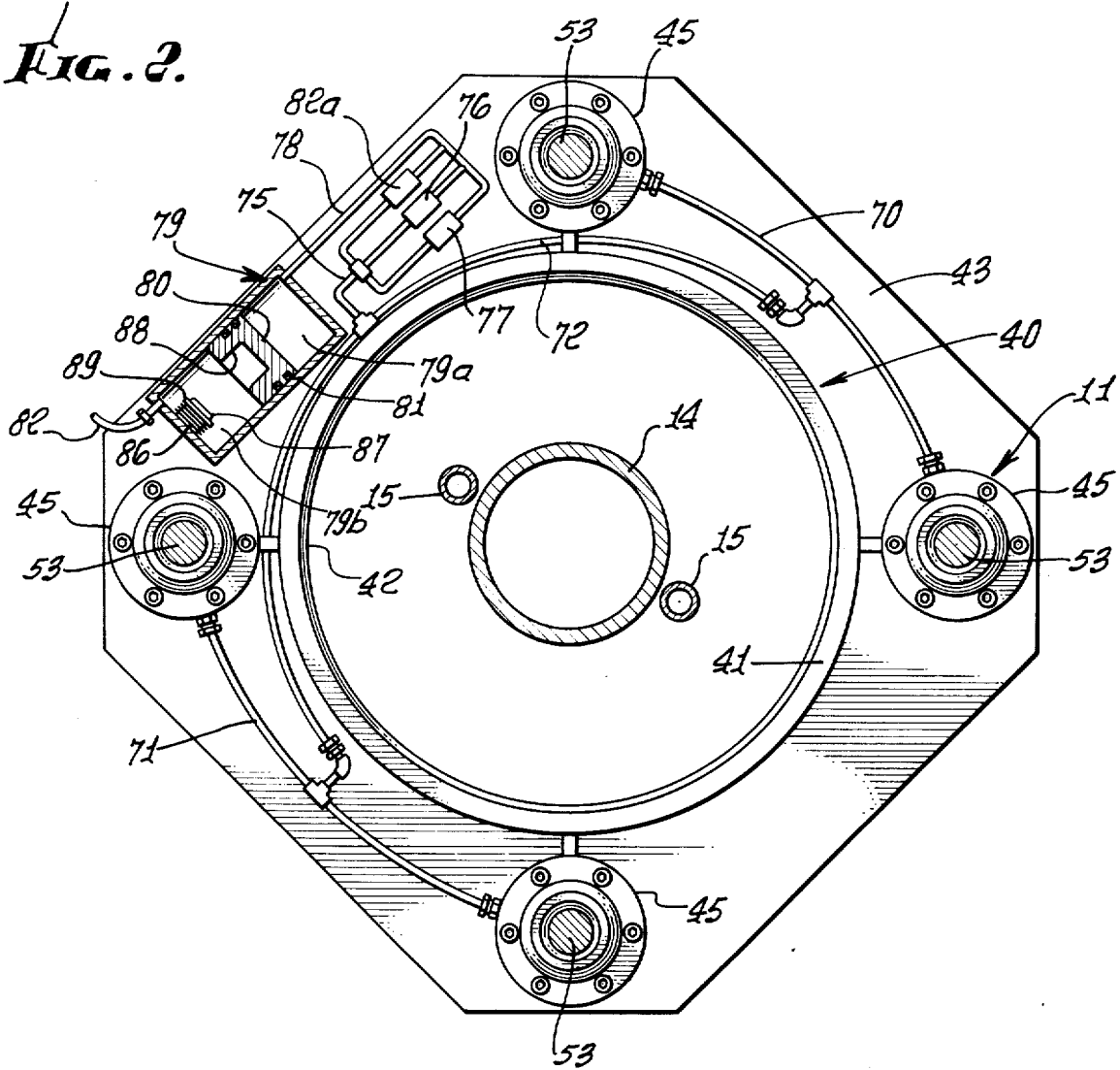
FIG. 2 is a cross-section, on a reduced scale, taken along the line 2—2 on FIG. 1.
Figure 4:
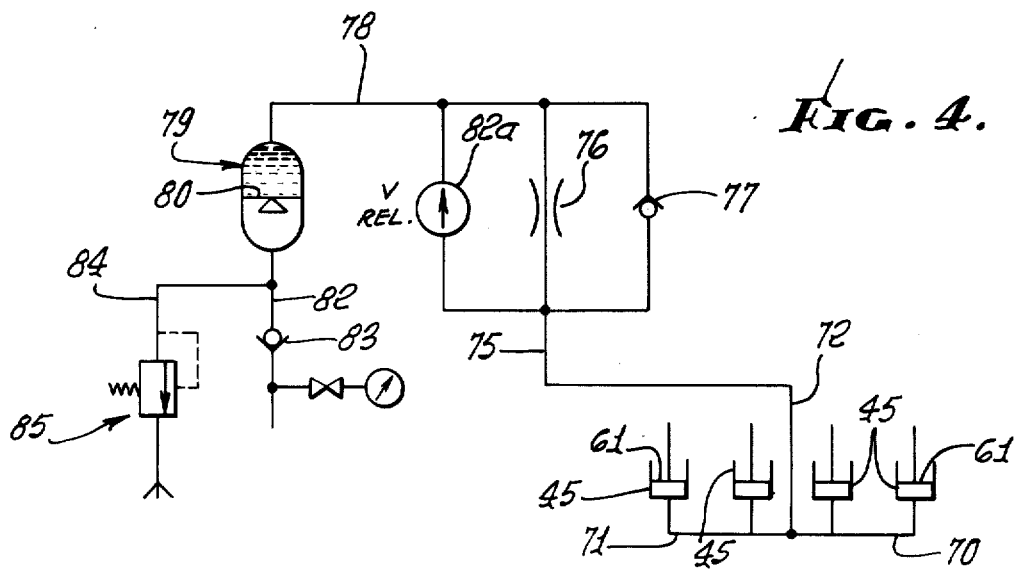
FIG. 4 is a diagrammatic view of the shock absorber system embodying the apparatus disclosed in FIGS. 1 to 3, inclusive.

Hydraulic oil, or other suitable fluid, can pass freely between the cylinders 45. As shown in FIG. 2, a tubing 70 interconnects a pair of cylinders on one side of the shock absorber apparatus; whereas, another tubing 71 interconnects the cylinders on the other side of the apparatus. These two tubing members 70, 71 are interconnected with one another by an intervening tubing 72. Each tubing is suitably connected to a port 73 (FIG. 3) extending through the cylinder to its interior, hydraulic oil in this system being capable of passing through a slot or slots 74 at the lower end of each cylinder sleeve 47 to the interior of the latter, with the oil filling the cylinder sleeve space below its associated piston 61. The hydraulic oil in the tubing members 70, 71, 72 and in all of the cylinders is capable of moving from the intervening tubing 72 through a branch line 75, communicating with a suitable orifice 76 (FIGS. 2, 4), there being a check valve 77 arranged in parallel with the orifice and connected to its downstream side and upstream side. The downstream side of the orifice is connected through a tubing 78 to an accumulator cylinder 79 that has a piston 80 slidable therein, suitable seals 81 being provided on the periphery of the piston for sealing against the cylinder wall to prevent leakage past the piston. A pressure relief valve 82a is also connected in parallel across the orifice 76, communicating with the line 78 leading to the accumulator cylinder. This pressure relief valve is set to open at a desired value above the maximum pressure to be developed on the high pressure side of the orifice, so as to open and bypass the orifice when the hydraulic pressure exceeds a safe maximum. The relieved liquid passes into the accumulator cylinder 79 and shifts the piston 80 in the cylinder against compressed air on the other side of the piston, this compressed air being provided from a suitable source, such as a rig air line 82.

The line 82 from the compressed air source has a check valve 83 therein which automatically opens to permit passage of the compressed air into the cylinder 79 on the air side of the piston 80. This check valve will close to prevent compressed air from passing from the cylinder 79 in a reverse direction. An exhaust line 84 extends from the inlet line 82, between the check valve 83 and cylinder 79, to a pressure relief valve 85 which can be set to open at any desired pressure above the inlet air pressure. As an example, if the inlet air pressure is 100 p.s.i., the pressure relief valve 85 may be set to open at 125 p.s.i. The exhaust line pressure will be the same as the pressure on the air side of the piston 80 and will increase as the piston moves in the cylinder under the influence of the liquid under pressure passing through the orifice 76. Such liquid under pressure will move the piston against the resistance provided by the compressed air to a position in which the piston is brought to rest after engaging a stack of Belleville springs or washers 86 disposed around a post 87 fixed to the end of the cylinder 79, and which is adapted to be received in a central cavity 88 in the piston, as the piston moves against the Belleville springs. A suitable retainer ring 89 is mounted on the post to prevent shifting of the springs 86 from their operative position surrounding the post 87.

In the use of the apparatus, the cylinder 47 and interconnected tubing, including the lines leading to and from the check valve, orifice and pressure relief valve, and leading from the latter to the liquid end of the accumulator cylinder 79, are filled with oil, which is also true of the accumulator cylinder itself, with the accumulator piston 80 occupying an intermediate position within the cylinder. Assuming a string of marine riser sections 14 are extending within the spider 10, shock absorber 11 and rotary table 12, with the blowout preventer stack (not shown) mounted on the lower end of the marine riser string, and with the marine riser assembly being lowered in the water with the riser support plate 26 disposed above the spider, the spider dogs 24 are shifted to their horizontal position in the path of the riser support plate on the upper riser section. This plate engages the dogs, the entire load of the riser being transmitted through the dogs and the spider body 17 to the extension rods 53, and through the extension rods and seats 59 to the pistons 61, these pistons forcing the hydraulic oil, or other liquid, from the cylinders 45 and their associated lines and through the orifice 76 toward the liquid end 79a of the accumulator cylinder, forcing the accumulator piston 80 toward the post 87, the compressed air in the air end 79b of the cylinder being forced from the cylinder and through the pressure relief valve 85 to the atmosphere, when the pressure setting of the relief valve is exceeded.

During the usual operation of the apparatus, the riser support plate 26 is not permitted to engage the spider dogs or arms 24 with an inordinately high force, so that the static and dynamic loading of the riser 14 on the spider will depress the pistons 61 in the shock absorber cylinders without sufficient pressure being built up as to open the pressure relief valve 82. The hydraulic fluid is throttled through the orifice 76 and passes into the accumulator 79, the orifice causing most of the energy to be absorbed by the hydraulic fluid. By way of example, the shock absorber pistons will move approximately three inches, thus displacing the fluid from the four cylinders, the total displacement of the liquid resulting in the accumulator piston 80 shifting downwardly in its companion cylinder until it bottoms out against the Belleville spring stack 86. So moving the piston, as noted above, will cause some of the compressed air in the system to vent through the pressure relief valve 85.

After the next riser joint is connected to the pin end 27 of the riser supported on the dogs 24, the riser string is elevated, relieving the spider and the shock absorber system of load, the spider dogs 24 being pivoted to their vertical position which will enable lowering of the riser string to proceed. Upon relieving of the load on the spider, the compressed air in the line 82 will pass through the check valve 83 to shift the accumulator piston 80 toward its initial position, which will shift the oil from the accumulator cylinder and through the lines back into the shock absorber cylinders 45, elevating the pistons 61 and the spider 10 connected thereto through the extension rods 53 to their initial positions. Upon engagement of the support plate 26 on the next riser section with the spider dogs 24, which have again been reshifted to their inward horizontal position, the shock absorbing action will again take place through the load on the riser being transmitted to the shock absorbing pistons 61, again causing the hydraulic fluid to be throttled through the orifice 76 in flowing into the accumulator.

In the event the riser support plate strikes the spider dogs at a substantial velocity caused, for example, by the carelessness of the driller, the deceleration forces due to the velocity of the riser are reduced considerably, since the riser is not brought to an immediate stop, but, in the example given above, can effect movement of the spider of as much as three inches, which is an ample stroke to dissipate the hydraulic pressure developed in the cylinders through the orifice 76, to produce a relatively gradual deceleration of the spider to a fully arrested condition. In the event that the impact of the riser support plate on the spider is inordinately high, so as to tend to develop a high pressure on the upstream side of the orifice, which, for example, might exceed 3,000 p.s.i., the pressure relief valve 82a will open to permit the excessive pressure to exhaust to the accumulator 79. In this manner, bursting of the hydraulic lines in the system is prevented.

The slidable seats 59 within the pistons 61 and the ball and socket joint connection 57, 58 between each extension rod 53 and slidable seat permit the spider 10 to partake of a limited lateral translation with respect to the shock absorber 11, and it also permits the spider to tilt to a limited degree about a central axis of the system. The universal tilting action of the spider can occur since the cylinders 47 are all interconnected hydraulically and one piston 61 can be displaced to a greater extent than the other pistons, which will permit the extension rods 53 to assume differing vertical positions. Thus, a universal joint arrangement is provided in which the riser spider 10 can pivot on a cushion of the hydraulic fluid in the system.

I claim:

1. Shock absorber apparatus for supporting a tubular string to be lowered through the apparatus, comprising a shock absorber body adapted to be supported by a rotary rig table, a spider above said body and adapted to be engaged by the tubular string to support the same, cylinders connected to one of said body and spider and adapted to contain a fluid, pistons in said cylinders, extension rods rigidly connected to the other of said body and spider, a seat slidable laterally in each piston, said extension rods engaging said seats to support said spider for lateral translation relative to said shock absorber body, and means for restricting flow of fluid from said cylinders upon engagement of said tubular string with said spider and relative displacement of said pistons in said cylinders to reduce the decelerating force imparted by the tubular string to said spider.

2. Apparatus as defined in claim 1; an accumulator connected to said flow restricting means and into which the fluid can pass, and means for returning the fluid from said accumulator toward said cylinder means upon disengagement of the tubular string from said spider.

3. Apparatus as defined in claim 1; an accumulator connected to said flow restricting means and into which the fluid can pass, and means for returning the fluid from said accumulator toward said cylinder means upon disengagement of the tubular string from said spider, said fluid returning means including a check valve connected in parallel with said flow restricting means, said check valve opening to permit return flow of fluid to said cylinder means and closing to require flow of fluid from said cylinder means through said restricting means.

4. Apparatus as defined in claim 1; an accumulator cylinder communicating with said flow restricting means and into which the fluid can pass, an accumulator piston in said cylinder separating the cylinder into a first portion to receive the fluid at one side of the piston and a second portion to receive another fluid at the opposite side of the piston, and means for feeding said another fluid into said second portion for action upon said piston in opposition to the action upon the piston by said first-mentioned fluid.

5. Shock absorber apparatus for supporting a tubular string to be lowered through the apparatus, comprising a shock absorber body adapted to be supported by a rotary rig table, a spider above said body and adapted to be engaged by the tubular string to support the same, cylinder means connected to one of said body and spider and adapted to contain a fluid, piston means in said cylinder means and connected to the other of said body and spider, and means for restricting flow of fluid from said cylinder means upon engagement of said tubular string with said spider and relative displacement of said piston means in said cylinder means to reduce the decelerating force imparted by the tubular string to said spider; and accumulator connected to said flow restricting means and into which the fluid can pass, and means for returning the fluid from said accumulator toward said cylinder means upon disengagement of the tubular string from said spider, said fluid returning means including a check valve connected in parallel with said flow restricting means, said check valve opening to permit return flow of fluid to said cylinder means and closing to require flow of fluid from said cylinder means through said restricting means, and a pressure relief valve connected in parallel with said flow restricting means to bleed high pressure fluid from said cylinder means to said accumulator.

6. Shock absorber apparatus for supporting a tubular string to be lowered through the apparatus, comprising a shock absorber body adapted to be supported by a rotary rig table, a spider above said body and adapted to be engaged by the tubular string to support the same, cylinder means connected to one of said body and spider and adapted to contain a fluid, piston means in said cylinder means, extension rods connected to the other of said body and spider and operatively engaging said piston means, and means for restricting flow of fluid from said cylinder means upon engagement of said tubular string with said spider and relative displacement of said piston means in said cylinder means to reduce the decelerating force imparted by the tubular string to said spider; said cylinder means including a plurality of circumferentially spaced shock absorber cylinders, said piston means including shock absorber pistons slidable relatively in said shock absorber cylinders, means providing fluid intercommunication between said cylinders, said flow restricting means being connected to said fluid intercommunication means, an accumulator cylinder connected to said flow restricting means and into which the fluid can pass, an accumulator piston in said accumulator cylinder separating said accumulator cylinder into a first portion to receive the fluid at one side of the accumulator piston and a second portion to receive another fluid at the opposite side of the accumulator piston, and means for feeding said another fluid into said second portion for action upon said accumulator piston in opposition to the action upon the accumulator piston by said first-mentioned fluid to return said first-mentioned fluid from said accumulator cylinder toward said shock absorber cylinders upon disengagement of the tubular string from said spider.

7. Apparatus as defined in claim 6; a check valve connected in parallel with said flow restricting means, said check valve opening to permit return flow of fluid from said accumulator cylinder toward said shock absorber cylinders and closing to require flow of fluid from said shock absorber cylinders through said flow restricting means.

8. Apparatus as defined in claim 7; and a pressure relief valve connected in parallel with said flow restricting means to bleed high pressure fluid from said shock absorber cylinders to said accumulator cylinder.

9. Shock absorber apparatus for supporting a tubular string to be lowered through the apparatus, comprising a shock absorber body adapted to be supported by a rotary rig table, a spider above said body and adapted to be engaged by the tubular string to support the same, cylinder means connected to one of said body and spider and adapted to contain a fluid, piston means in said cylinder means, extension rods connected to the other of said body and spider and operatively engaging said piston means, and means for restricting flow of fluid from said cylinder means upon engagement of said tubular string with said spider and relative displacement of said piston means in said cylinder means to reduce the decelerating force imparted by the tubular string to said spider; said cylinder means including a plurality of circumferentially spaced shock absorber cylinders, said piston means including shock absorber pistons slidable relatively in said shock absorber cylinders, means providing a fluid intercommunication between said cylinders, said flow restricting means being connected to said fluid intercommunication means, an accumulator cylinder connected to said flow restricting means and into which the fluid can pass, an accumulator piston in said accumulator cylinder separating said accumulator cylinder into a first portion to receive the fluid at one side of the accumulator piston and a second portion to receive another fluid at the opposite side of the accumulator piston, and means for feeding said another fluid into said second portion for action upon said accumulator piston in opposition to the action upon the accumulator piston by said first-mentioned fluid to return said first-mentioned fluid from said accumulator cylinder toward said shock absorber cylinders upon disengagement of the tubular string from said spider; said shock absorber cylinders being on said body, said extension rods connecting said shock absorber pistons to said spider.

10. Apparatus as defined in claim 9; and means between said extension rods and shock absorber pistons supporting said spider for lateral translation relative to said shock absorber body.

11. Apparatus as defined in claim 9; and means between said extension rods and shock absorber pistons supporting said spider for universal movement with respect to said shock absorber body.

12. Apparatus as defined in claim 9; and means between said extension rods and shock absorber pistons supporting said spider for lateral translation relative to said shock absorber body, and means between said extension rods and shock absorber pistons supporting said spider for universal movement with respect to said shock absorber body.

13. Apparatus as defined in claim 9; a seat shiftable laterally in each shock absorber piston, said extension rods engaging said seats to support said spider for lateral translation relative to said shock absorber body.

14. Apparatus as defined in claim 3; each seat having a spherical socket therein, each extension rod having a spherical terminal disposed in said socket.

15. Shock absorber apparatus for supporting a tubular string to be lowered through the apparatus, comprising a shock absorber body adapted to be supported by a rotary rig table, a spider above said body and adapted to be engaged by the tubular string to support the same, cylinders connected to one of said body and spider and adapted to contain a fluid, pistons in said cylinders, extension rods rigidly connected to the other of said body and spider, a seat shiftable laterally in each piston, said extension rods engaging said seats to support said spider for lateral translation relative to said shock absorber body, and means for restricting flow of fluid from said cylinders upon engagement of said tubular string with said spider and relative displacement of said piston in said cylinders to reduce the decelerating force imparted by the tubular string to said spider; each seat having a spherical socket therein, each extension rod having a spherical terminal disposed in said socket.

16. Shock absorber apparatus for supporting a tubular string to be lowered through the apparatus, comprising a shock absorber body adapted to be supported by a rotary rig table, a spider above said body and adapted to be engaged by the tubular string to support the same, cylinders connected to one of said body and spider and adapted to contain a fluid, pistons in said cylinders, extension rods rigidly connected to the other of said body and spider, a seat slidable laterally in each piston, said extension rods engaging said seats to support said spider for lateral translation relative to said shock absorber body.

17. Shock absorber apparatus for supporting a tubular string to be lowered through the apparatus, comprising a shock absorber body adapted to be supported by a rotary rig table, a spider above said body and adapted to be engaged by the tubular string to support the same, cylinders connected to one of said body and spider and adapted to contain a fluid, pistons in said cylinders, extension rods rigidly connected to the other of said body and spider, a seat shiftable laterally in each piston, said extension rods engaging said seats to support said spider for lateral translation relative to said shock absorber body; each seat having a spherical socket therein, each extension rod having a spherical terminal disposed in said socket.

* * * * *